March 30, 1965  D. A. REED, JR  3,175,619

ROTARY WING AIRCRAFT

Filed Nov. 19, 1962  4 Sheets-Sheet 1

INVENTOR.
DAVID A. REED JR.

BY
ATTORNEY

INVENTOR.
DAVID A. REED JR.
BY Allan Bottinberg
ATTORNEY

FIG. 4

INVENTOR.
DAVID A. REED JR.

March 30, 1965    D. A. REED, JR    3,175,619
ROTARY WING AIRCRAFT

Filed Nov. 19, 1962    4 Sheets-Sheet 4

FIG. 6

INVENTOR.
DAVID A. REED JR.

BY *Allan Rothenberg*

ATTORNEY

United States Patent Office 3,175,619
Patented Mar. 30, 1965

3,175,619
ROTARY WING AIRCRAFT
David A. Reed, Jr., Anaheim, Calif., assignor to
North American Aviation, Inc.
Filed Nov. 19, 1962, Ser. No. 238,393
15 Claims. (Cl. 170—160.13)

This invention relates to the automatic control of rotary wing aircraft and particularly concerns such control means which will operate the craft blades to control rotational velocity and thrust in accordance with external flight conditions and variations thereof.

Thrust and other structural loads imposed upon the rotor blades of a rotary wing aircraft are determined largely by angular positions and rotational velocity of the rotary blades. These in turn are governed to a large extent by flight conditions such as the air density and velocity of the vehicle. Thus, structural characteristics of the rotor and blades which limit thrust and rotational velocity will impose limitations on use of the craft in certain environment and flight conditions. In particular, the use of a rotary wing craft for recovery of loads or to provide descent of loads from high altitudes and at high initial velocities imposes a broad spectrum of flight conditions which may cause intolerable structural loads. Initial craft velocity may be quite high in a medium of low density whereas the terminal portions of the flight will occur at relatively low velocity in air of relatively high density. While the problem of control of thrust and rotor velocity can be solved with adequate control by the pilot the difficulties are particularly acute in unmanned craft where flight condition variations cannot be so easily sensed and corrected.

Accordingly, it is an object of this invention to provide for the automatic control of thrust and rotational velocity of the rotor of either manned or unmanned rotary wing craft in accordance with a wide range of variation of flight conditions.

In carrying out the principles of this invention in accordance with a preferred embodiment thereof a rotary wing craft is provided with a novel thrust control which operates in response to thrust exerted on the blades to control both blade pitch and blade rotational velocity whereby such velocity and thrust are maintained at efficient and operable magnitudes. The invention provides a rotor with automatic sensing of flight velocity and atmospheric conditions, resulting in an automatic rotor control that prevents rotor overspeed and excessive thrust. Further, the invention results in automatic selection of the proper state of rotor performance, selects conditions of flight most efficient for energy absorption during deceleration without self destruction and selects different control settings of pitch and cone angle which are required in supersonic and subsonic flight, whether transiently decelerating or in steady flight, to prevent self destruction.

Throughout the description the term "cone angle" is used in a conventional sense to indicate the angle between the average position of the several blades and a plane normal to the axis of blade rotation, as measured in a plane perpendicular to the first mentioned plane. The term "flap angle" designates the angle analogous to the cone angle but defining the position of but a single one of the blades.

In an illustrated mechanization of the invention blades of a rotary wing craft are mounted for motion through variable pitch and cone angles and interlock means is provided for controlling pitch angle motion and cone angle motion of the blades in a predetermined relation. That is, the interlock means provides for a predetermined ratio of pitch angle change to flap angle change. This "delta 3 control" or pitch angle-cone angle interlock device is operated in response to either or both of a pitch control signal and a thrust limiting signal. The pitch control signal may be provided by substantially conventional cyclic and collective pitch control arrangements although there is disclosed herein a pitch control arrangement which is particularly adapted for operation with the illustrated interlock device. The second operating input to the interlock control means is provided by a thrust limiting signal produced by axial motion of the rotor hub assembly against a restraining force of a magnitude substantially equal to the maximum allowable or desirable thrust upon the blades. The operation is such that when the thrust upon the blades exceeds a preselected value the interlock means is operated to increase the blade pitch angle, increasing the rotational drag, decreasing rotational velocity, and increasing cone angle to effect decrease in aerodynamic thrust upon the blades whereby the blades are stabilized at a lower rotational velocity, lower thrust and greater cone angle. Thus, it will be seen that the arrangement of this invention permits flight over wide variations of trajectory, velocity and aerodynamic density regardless of the combination of such velocity and/or density, the flight being limited only by the thermodynamic and structural integrity of the materials of the rotor. The automatic control of thrust and rotor rotational velocity is effective throughout a number of different settings of collective or cyclic pitch control of the rotor for terminal steady state flight or high speed controlled trajectory.

Accordingly, it is a further object of this invention to provide for automatic and efficient operation of a rotary wing craft over a wide range of flight velocities and atmospheric densities.

Other objects include the sensing of flight velocities and atmospheric densities to automatically control the rotor to prevent self-destruction, the automatic selection of the most efficient performance mode for reduction of excess axial flight velocity, the provision of rotor flight control to safeguard the rotor from self-destructive angular velocities and axial thrust even in the presence of operative cyclic and collective pitch control which may be set for predetermined conditions, and the application of a protective rotor control which will not interfere with normal cyclic and/or collective pitch control when the protective features are not required.

From one point of view the arrangement of the present invention which senses flight conditions and provides for rotor operation which is most efficient in the course of such flight conditions may be considered to be a mechanical analog computer which solves the various aerodynamic equations of the rotor blades. It is contemplated that the principles of this invention may be applied for use in wind-tunnel testing to study the response characteristics and operations of a rotating wing system. For such an application a rotating wing assembly embodying the principles of this invention may have applied thereto various sensing instruments such as potentiometers, strain gages, or other transducers which will sense the motion, forces, and strains on the several interconnected parts of the rotary wing assembly when the latter is subjected to the preselected aerodynamic environment of a wind tunnel. Since the mechanical arrangement, which may be deemed an analog computer, operates to achieve a position and mode of operation of maximum efficiency for the several parts of the rotary blade assembly the various motions and positions of the several parts of the assembly will be indicated by the detecting devices to provide readout of various parameters of the aerodynamic equations. Thus, another object of the invention is to provide a rotary blade assembly and control mechanism therefor which will automatically provide for solution of the aerodynamic equations to achieve a mode of operation of maximum efficiency. These and other objects and advantages of the invention will become more readily apparent in the light of the following description and the accompanying drawings in which.

In the drawings like numerals refer to like parts.

Figures 1, 7:
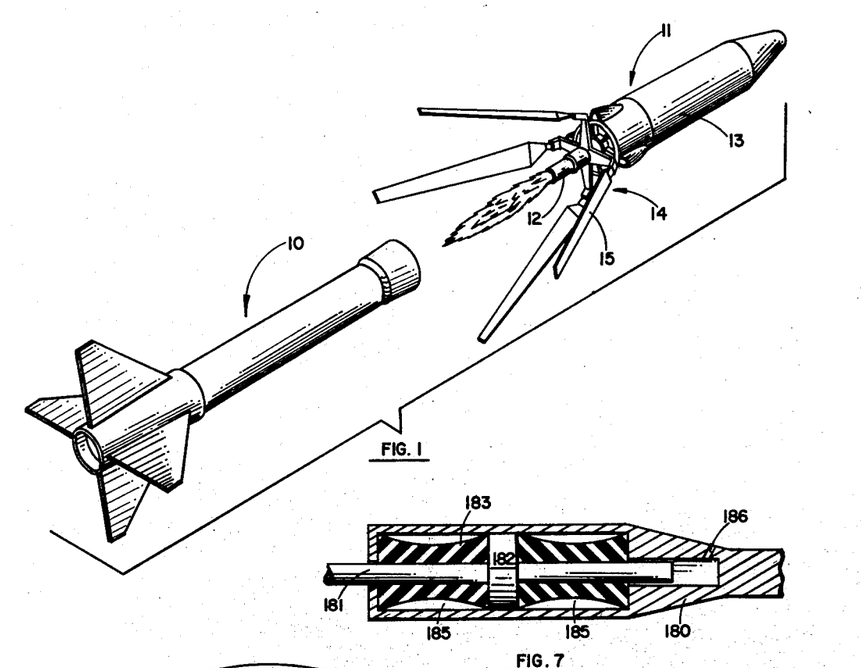
FIG. 1 illustrates the principles of this invention as applied to a rocket propelled recoverable payload.
FIG. 7 illustrates details of a synchronizing link.

While the invention is applicable to manned and unmanned, powered and unpowered rotary winged craft a most significant aspect comprises the automatic control over a range of flight conditions which is substantially greater than that to which a manned craft may ordinarily be subjected. Accordingly, the principles of the invention are illustrated as applied to the automatic control of an unmanned unpowered craft in which the blade rotation is effected by aerodynamic forces. Shown in FIG. 1 is such an unmanned craft comprising a rocket assembly 10 which as illustrated has just been fired and separated from a recoverable load assembly 11 including a payload portion 13 and a rotary wing assembly 14. The assembly 14 includes four rotating blades 15 which are mounted as will be more particularly described below to be folded inwardly toward their axis of rotation for the purpose of enabling compact packaging during launch. Separation of the payload assembly from the rocket assembly is achieved by conventional means such as the illustrated rocket motor 12 which may provide an additional initial thrust and velocity increment to the payload. After separation the blades are unfolded by means of the aerodynamic forces which will act thereon in a manner to be more particularly described below.

Upon deployment of the payload assembly from the rocket assembly the blades 15 are initially unfolded as more particularly described hereinafter to an amount and with a sufficient pitch angle as will cause spinning in the desired direction of rotation about the rotor center line as the craft velocity carries it through the atmosphere. As the payload approaches the earth's atmosphere, assuming deployment above the atmosphere, air density increases to a point where it is sufficient together with the payload velocity to increase the rotational velocity of the rotor blades. As the payload continues on its trajectory acted upon by the forces of its initial momentum, gravity, and the aerodynamic forces on the blades, the mechanism of the rotor control of this invention operates automatically or according to some predetermined program to afford a desired deceleration and terminal condition for touchdown while controlling the blades to avoid self-destruction.

Figure 2:
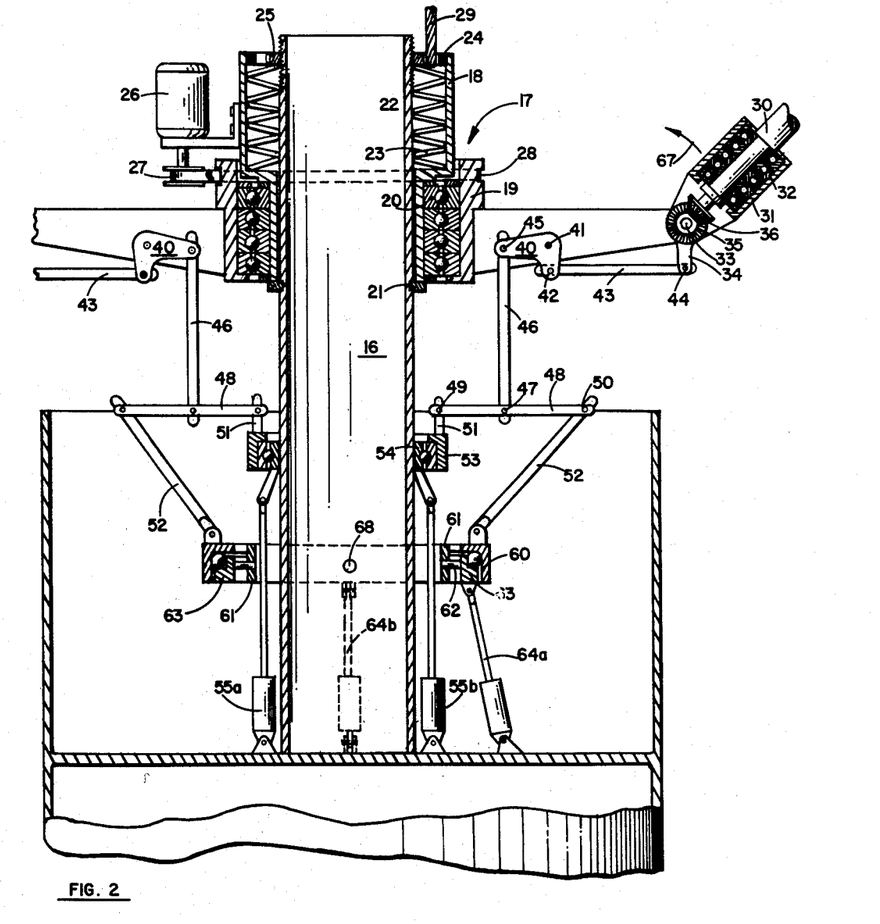
FIG. 2 schematically depicts an embodiment of this invention.

As illustrated in FIG. 2 the payload will be secured to a shaft 16 on which is mounted a rotor hub assembly 17. The hub assembly includes a sleeve 18 and a rotor hub 19 mounted thereon by means of bearings 20 for rotation about the axis of shaft 16. The sleeve 18 together with the rotor hub 19 mounted thereon are carried by the rotor shaft 16 for limited axial motion while a suitable keyway is provided to prevent rotation of the sleeve relative to the shaft 16. Axial motion of the sleeve downwardly in the drawing relative to the shaft 16 is limited by the washer 21 which is fixed to the shaft. The sleeve 18 has an enlarged diameter portion which provides, in cooperation with the shaft 16, an annular space for reception of a spring 22 bearing against the lower shoulder 23 of the sleeve and against an upper inwardly directed flange 24 fixedly secured to the upper end of sleeve 18. For the purpose of adjusting the force exerted by the spring upon the sleeve and rotor assembly an adjustable nut 25 is threaded upon the shaft 16 so that upon rotation of the nut 25 by preset manual adjustment, remote control or programmed adjustment the compressive force exerted by this spring may be selectively varied. Illustrated in the drawing is a portion of a worm 29 which may be operated by suitable means, not shown, to effect adjustment of the nut.

As the rotor assembly spins, friction in the bearings may tend to cause shaft 16 and the load to spin therewith. If this effect should be considered to be undesirable there is provided a motor 26 fixedly mounted to the sleeve 18 or a suitable support element affixed thereto and connected to drive a belt 27 entrained in a groove 28 which is formed in an upwardly extending portion of the rotor hub 19. The electric motor is caused to rotate at a predetermined average speed such that the output torque provided by the belt 27 tending to effect rotation of the rotor relative to the shaft is substantially equal and opposite to the friction torques in the bearing produced by the normal operation of the rotor blades. Accordingly, the rotation of the blades due to aerodynamic forces will not cause any substantial rotation of the shaft and payload affixed thereto. If deemed necessary or desirable the speed of motor 26 may be caused to vary with frictional torques by manual or other control. For example, for precise control of local rotation sensors on the payload such as a rate gyro, magnetic compass, or radio beacon sensing may be provided to control the power input to motor 26.

Figure 4:
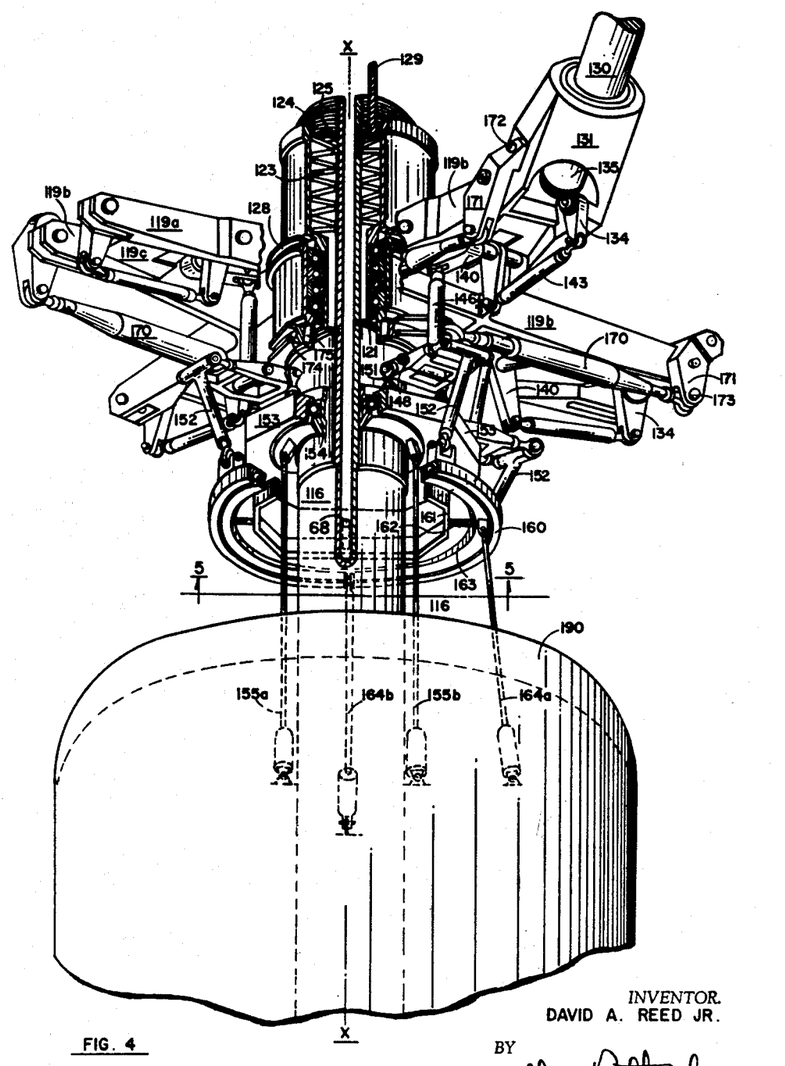
FIG. 4 is a pictorial representation with parts broken away of a four-bladed embodiment of the invention.
Figure 5:
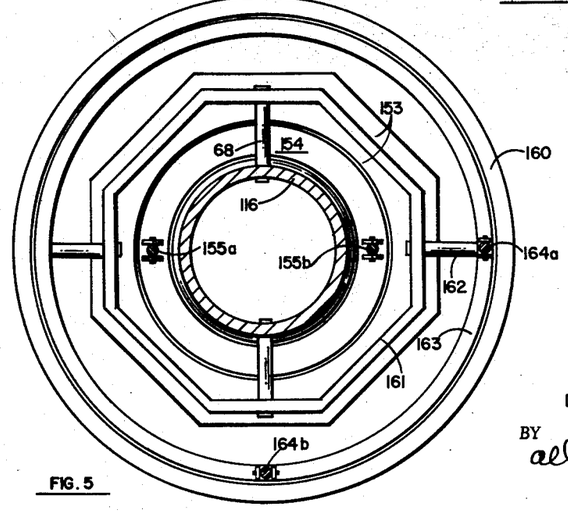
FIGS. 5 and 6 are sectional views of the embodiment of FIG. 4.

Mounted upon the rotor hub 19 for pivotal motion through variable pitch and cone angles are a plurality of blades of which but one, designated at 30, is shown in FIG. 2. It is to be understood that the blades may be two or more in number. Reference is made to FIG. 4 which shows an embodiment of the invention wherein four equally spaced blades are employed. Whether two or more blades are employed each will be mounted and connected in a manner substantially identical to that shown and described in connection with the blade 30. The blade 30 comprises a blade shaft which is mounted for pivotal motion about the blade axis in a sleeve 31 by means of bearings 32. Sleeve 31 is mounted for pivotal motion about a flap pivot pin 33 which is fixedly carried by the rotor hub 19. Also mounted for pivotal motion on the pivot pin 33 is a lever arm 34 fixedly carrying a reference gear 35 which meshes with a follower gear 36 fixedly attached to the blade shaft 30. A first summing link in the form of a bell crank 40 is pivotally mounted at 41 to the rotor hub 19 and is pivotally connected at 42 to a link 43 having the other end thereof pivoted at 44 to the lever arm 34.

Summing link 40 is pivotally connected at 45 to a pitch actuating link 46 having the other end thereof pivotally connected at 47 to a point intermediate the ends of a second or pitch summing link 48. The respective ends of summing link 48 are pivotally connected at 49 and 50 to a collective pitch link 51 and a cyclic pitch link 52 in an arrangement which transmits either one or both of the cyclic or collective pitch control signals to the blades.

Collective pitch control link 51 is fixed to a collective pitch ring 53 which is mounted for rotation about the axis of shaft 16 upon a collective pitch sleeve 54 slidably mounted upon shaft 16 and actuated throughout its slidable motion by means of a pair of diametrically opposite collective pitch extensible link actuators 55a and 55b.

Cyclic pitch control link 52 is pivotally connected to a cyclic pitch control ring 60 which is mounted for rotation about the axis of shaft 16 upon a two axis gimbal system of substantially conventional configuration and function. The gimbal system includes, as well known, an inner gimbal 61 mounted on the shaft 16 for pivotal motion about the axis 62 which lies in the plane of the paper. An outer gimbal ring 63 is mounted on the ring 61 for pivotal motion relative to ring 61 about an axis 68 perpendicular to the plane of the drawing and intersecting the axis of shaft 16 and axis 62. The cyclic pitch control ring 60 is rotatably mounted upon the outer gimbal 63 which is actuated about the axis of its pivotal mounting on inner gimbal 61 by means of an extensible link actuator 64b. A second degree of pivotal motion is imparted to the outer gimbal ring 63 by means of a second extensible link actuator 64a similar to that illustrated at 64b. The actuators are connected between the shaft 16 or a suitable support affixed thereto and points on the outer gimbal ring 63 which are mutually spaced 90° about the periphery of the ring 63.

Figure 3:
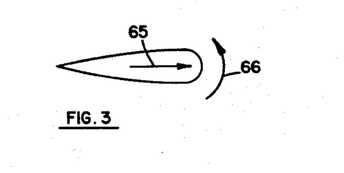
FIG. 3 is a blade section illustrating certain blade motions.

For the purpose of this discussion it will be considered that the blades will normally rotate in a counterclockwise direction when viewed from the top of shaft 16 and looking downwardly toward the blades along the axis of the shaft. For such a direction of rotation the blade 30 illustrated in FIG. 2 is rotating and positioned such that its leading edge is moving inwardly toward the plane of the paper while the trailing edge is extending outwardly from the plane of the paper. A section of the blade looking inwardly toward the flap pivot axis 33 would appear as illustrated in FIG. 3 with the blade moving in the direction of the arrow 65. With the geometry thus defined a counterclockwise pivotal motion of the blade about its longitudinal axis in the direction of arrow 66 of FIG. 3 is defined as an increase in pitch angle while a pivotal motion in a clockwise direction as viewed in FIG. 3 is defined as a decrease in pitch angle.

So too, a motion of the blade about its flap pivot pin 33 in the direction of arrow 67 is defined as an increase in cone angle or increase in flap angle whereas a pivotal flap motion in a clockwise direction as viewed in FIG. 2 is defined as a decrease in flap angle.

It will be seen that the blades, all similar to that shown, are mounted for motion through variable pitch and cone angles. The ratio of the variation of a change in pitch angle to a change in flap angle of a given blade is controlled by the interaction of reference gear 35 and follower gear 36, which are operated by an interlock control means including these gears, the lever arm 34 and the link 43. Pivotal motion of the blade about the flap pivot 33, assuming link 43 to remain fixed, will result in a change in pitch angle of the blade 30 in accordance with the gear ratio of the gears 35 and 36. In the arrangement illustrated a variation of flap angle such as to increase the flap angle will result in a decreased pitch angle.

The interlock control means is arranged to be operated by either one of two control signals or their combination. The first control signal is afforded by the operation of the pitch actuating link 46. This signal is manifested by position of the link. The second control signal input to the interlock control means is afforded by the axial sliding motion of the entire rotary assembly relative to the shaft 16. In this arrangement the summing link or bell crank 40 operates to combine the pitch control signal which is the position of link 46 and the thrust control signal which is the axial position of the rotor sleeve and hub. The summing link is connected to feed this combination of signals to the interlock control means at the pivot point 42 of its link 43.

More specifically it will be readily appreciated that any rotation of the summing link 40 relative to the rotor hub 19 about pivot point 41 will result in motion of link 43 and operation of the interlock control means to vary flap angle and pitch angle of the blade 30. Directly, the flap angle of each blade is controlled by inertial and aerodynamic forces acting thereon. Indirectly, however, the flap angle is controlled through the interlock control means which will vary the pitch angle of the blade to vary the aerodynamic forces thereon and thus vary the flap angle. Flap angle, is of course, a function of the aerodynamic thrust on the blade, the air density and the centripetal acceleration due to the rotational velocity. For example, in order to increase pitch angle of the blade the link 46 is moved downwardly (as viewed in FIG. 2) so as to effect a counterclockwise rotation of bell crank 40 about its pivot point 41. Through compressional force exerted upon link 43 by this rotation of the bell crank the lever arm 34 tends to rotate about its pivot 33 in a counterclockwise direction. Rotation of the lever arm 34 and gear 35 affixed thereto results in a rotation of the follower gear 36 which will appear to be a counterclockwise rotation when the blade is viewed in section looking inwardly toward the flap pivot pin. This counterclockwise rotation, rotation in direction of arrow 66 of FIG. 3 has been defined as an increase of pitch. Conversely, pitch of the blade may be decreased by effecting upward motion of pitch actuating link 46 and clockwise rotation of the summing link 40.

These control operations have been assumed to take place in the absence of axial motion of the hub assembly. If the latter motion should occur during pitch control the pitch control signal will merely be superimposed upon and combined with the thrust control signal caused by axial motion of the hub assembly to effect the pitch control and concomitant control of the rotor blade thrust and rotational velocity in accordance with the combined signal of pitch control and axial thrust control.

The mode of operation and functioning of cyclic pitch control and collective pitch control are well known in the art as described, for example, in Aerodynamics of the Helicopter by Alfred De Guesso and Gary C. Myers, Jr. published by the McMillan Company in 1952. Briefly, collective pitch control is operable to simultaneously and equally effect variation of the pitch angle of all blades. Cyclic pitch control as the name implies repetitively effects a predetermined or controlled amount of pitch variation of each blade in turn as it approaches a given angular position in the course of its rotation. Thus, if each blade, upon reaching a position wherein it is for example pointed North of the rotary wing assembly, is caused to increase its pitch angle at such position and only at or about such position, the assembly will experience an increased lift on the side facing North and be tilted accordingly, whereby the direction of travel may be controlled.

In the described arrangement, as illustrated in FIG. 2, collective pitch control is achieved by the extensible link actuators 55a, 55b which operate to effect axial sliding motion of the rotatable ring 53 to which are connected links 51 which operate the pitch control mechanisms of all blades of the assembly.

As with the collective pitch control, the cyclic pitch control link 52 together with the remainder of the mechanical chain which effects pitch control is duplicated for each of the blades in the assembly with additional links corresponding to link 52 being pivoted to the cyclic pitch control rotatable ring 60 and equally spaced around the gimbal system. One such link 52 is provided for each blade. While extensible links 55a, 55b and 64a, 64b are illustrated for purposes of exposition it will be readily appreciated that any suitable means whether remote controlled, programmed controlled, or pilot controlled, may be employed as is well known to effect the desired pivotal motion of the gimbal system for cyclic pitch control and the desired axial motion of the sleeve 54 for collective pitch control.

To provide the function of thrust limiting the arrangement is such that upon sensing the occurrence of a thrust exerted upon all blades collectively in an amount greater than a predetermined magnitude the entire rotor assembly will move axially upward in the illustration of FIG. 2 to provide a change of thrust control signal in the form of a displacement of rotor hub 19 and a concomitant displacement of pivot pin 41 of summing link 40. This displacement or thrust control signal, assuming for purposes of the present discussion that link 46 remains fixed, will result in a counterclockwise rotation of the summing link 40 together with its pivot pin 41 about the pivot point 45. Such rotation of the summing link 40 affords a compressive force on link 43 and rotation of lever arm 34 in a counterclockwise direction. The latter rotation will effect an increase in pitch angle through the interconnection of reference gear 35 and follower gear 36. The increase in pitch angle results in a decreased rotational velocity of the blades and an increased rotational drag. This increased drag and decreased velocity allow an increase of the cone angle of the blade due to the thrust exerted thereon and the now decreased centripetal acceleration (which normally tends to decease the cone angle). The increased cone angle by virtue of the interlock control means tends to cause a decrease in pitch angle toward the initial value thereof, whereby the rotor becomes stabilized at a lower rotational velocity, a somewhat similar pitch angle, an increased cone angle and a lower thrust value.

The arrangement is such that the mechanism will be caused to operate at or about a predetermined value of thrust. The spring force is so chosen that the net downward force including the control forces exerted upon the hub assembly in an axial direction by virtue of the pitch actuating links 46 will be equal to or greater than the aerodynamic thrust exerted on the blades tending to move the rotor assembly upwardly in FIG. 2 relative to shaft 16. Thus, with total aerodynamic thrust on the blades less than the predetermined sum of spring force and control force (within predetermined variations of the latter) the axially slidable assembly is bottomed against the stop 21. Should the thrust on the blades reach a predetermined value selected to avoid undesirable stresses on the structure of the assembly, the combined forces of the spring and control forces due to the links 46 are overpowered and the assembly shifts upwardly against the force of the spring so as to provide a thrust control signal input to the interlock control means in a manner which increases cone angle and decreases rotational velocity to decrease the thrust.

The schematically illustrated spring 22 will be preferably of the type known as a Belleville spring of which the non-linearity may be easily controlled. Preferably the spring is so constructed and adjusted that substantially fifty percent of its maximum deflection will occur when eighty percent of the maximum allowable aerodynamic thrust on the assembly occurs. In such an arrangement with thrust less than eighty percent of the maximum allowable the spring forces are operating over the initial portion of the spring deflection to an extent depending upon other forces such as those induced by the pitch actuating links. Accordingly, some thrust control operation may occur for thrust conditions below maximum allowable value for certain commanded pitch control signals. The non-linearity of the spring is such that beyond fifty percent deflection the magnitude of the spring force remains substantially constant. That is, the increase in spring force due to deflection beyond fifty percent of the spring deflection is small as compared with the change in spring force due to deflection less than fifty percent. With this arrangement further increase in aerodynamic thrust beyond the eighty percent value will not be additionally resisted but will result in axial displacement of the rotor hub assembly. Increase in thrust over and beyond the eighty percent of maximum allowable thrust thus yields greater axial deflection of the rotor hub assembly whereby the thrust will not reach a value beyond that selected by spring characteristics.

For the purpose of preselecting the characteristics of the spring and accordingly the maximum allowable aerodynamic thrust the adjustable nut 25 is provided which bears at its bottom on the upper portion of the spring 22 to effect a predetermined precompression thereof. It will be readily appreciated that the nut 25 may be provided with a programmed adjustment so as to effect variation of the thrust limit as the flight progresses. In a manned vehicle, provision may be made for control of nut 25 by pilot operation of worm 29.

The operation of the cyclic and collective pitch control involves a balance of the aerodynamic and inertial moments of forces acting on the blades. The blade flap angle is initially maintained by a balance of such aerodynamic and inertial moments of blade forces which are exerted about the flap pivot pin 33. Collective pitch control signals and cyclic pitch control signals are transmitted to the summing link 48 which accordingly transmits to the actuating link 46 a motion signal in the form of the sum of these two input signals. If the motion signal is in such a direction as to increase pitch motion of the gear 35 will impart an increased pitch rotational motion to the gear 36 and the attached blade 30. When the pitch angle is increased aerodynamic lift and drag forces vary so as to slow the rotor in angular velocity. As the rotor slows aerodynamic force moments increase relative to inertial force moments about the flap axis pivot 33. The blade will now flap up to an increased flap angle and a new condition of hinge moment balance. As the blade flap angle increases pitch is decreased by virtue of the action of the interlock control means which tends to restore the pitch angle toward its initial condition. The rotor in the new condition of blande hinge moment balance will operate at a new performance point in this situation.

The effect of the collective pitch control is to determine the rotor cone angle of operation and the level of thrust performance. In addition, the interlock control means will maintain the desired conditions including that of strict control of rotor angular velocities.

In the described application of the embodiment of the invention initial deployment of the rotary winged craft may result in supersonic aerodynamic velocities. Assuming for such initial conditions that the thrust control is not initially active the sleeve 18 is bottomed against the stop 21. Further, the supersonic aerodynamic center of the rotor blade will be somewhat aft of the blade pitch axis whereby the blade will experience a pitch torque about the blade pitch axis tending to decrease pitch angle and provide what is normally called a diving torque. With such a torque the gear 36 operates to tend to rotate gear 35 and lever arm 34 in a clockwise direction placing a compressive force on link 43, tending to effect clockwise rotation of summing link 40 and exerting a tensile force increment upon pitch actuator link 46. If the latter be held fixed due to the absence of any variation of cyclic or collective pitch control signals the net result is downward force exerted upon the rotor sleeve assembly which aids the force exerted by spring 22. This is an aerodynamically induced force in opposition to other thrust forces. It will be seen that the control geometry is such that the control force exerted by pitch actuating link 46 is less than the rotor thrust forces with the difference being taken up by the operation of the spring 22. Since axial thrust forces increase with increase of atmospheric density at a greater rate than the diving torque, the thrust limiting operation is in effect restricted under conditions of relatively low atmospheric density and is less restricted with increase in density as velocity decreases from supersonic.

Initially, due to the low ratio of atmospheric density to mass density of the rotor blades the cone angle of spin will be small, on the order of some fifteen degrees of angle necessary for control purposes. The pitch angle of the blade may be essentially zero degrees or negative in an amount sufficient to overcome aerodynamic drag and frictional and control torques during rotation. The blades are operating flat plate (e.g. in a manner similar to drag brakes) and blade flapping hinge moments are in balance. If the rotor tends to overspeed centripetal acceleration will decrease the rotor cone angle below the assumed 15° angle and the interlock control means accordingly will operate to increase blade pitch angle to a positive angle and counteract the tendency to overspeed. Rotational velocity control thus is assured in the initial flight trajectory. As the craft descends it penetrates deeper into the atmosphere so that increase in air density causes increase in rotor thrust since the flat plate drag of the blades increases. When the air density increases to a value where rotor thrust approaches predetermined allowable limits the thrust limiter operates to increase blade pitch angle to a positive value. There is a transient further increase in thrust at the instant of pitch angle increase but it may be noted that positive blade pitch angle causes increase of rotational drag whereby the rotor velocity decreases from the value initially regulated by the interlock control means. Aerodynamic moments of thrust about the blade flap axis 33 overcome the new lower inertial flap hinge moments of the blade as the rotor slows whereby the rotor cone angle is increased. As the cone angle is increased the action of the interlock control means reduces blade pitch toward the initial pitch angle and the apparatus stabilizes at a new and slower rotor speed. Rotor overspeed control and thrust control have prevented rotor destruction while permitting desired decrease of trajectory velocity.

The combined regulating function of rotor speed control and thrust control is capable of operation throughout the entire cone angle of the rotor. If necessary the rotor may approach ninety degrees of cone angle. High cone angle during operation reduces the effective frontal area of drag of the blades to the oncoming air. As the trajectory velocity of the craft continues to decline the thrust limiting operation and the interlock control means action may reverse in operation to decrease rotor control angle as may be required to maintain the desired thrust value. When trajectory velocities become subsonic the lift-drag ratio of the rotor increases, greatly improving the rotor's ability to spin and create thrust. As the rotor tends to increase in angular velocity the interlock control means will operate to regulate around positive pitch angles which may be on the order to 2° to 14° of positive incidence. The greater pitch angles which are regulated by the interlock control means in subsonic flight increase rotor thrust once again and may bring about further operation of the thrust limiting mechanism. The control cycles as described will repeat with increase and decrease of cone angle until terminal steady state sinking or glide velocities are obtained.

It may be noted that the above operation is completely independent of and in addition to the operation of the collective and/or cyclic pitch control arrangement which may be operated at any time before, after, or during the previously described thrust control limited mode of operation. Where collective pitch control signals may cause undesired rotor operation such pitch control will be overridden by the automatic operation of thrust control and interlock control means.

It will be seen that thrust level limiting and rotational speed limiting of the rotor are achieved with this invention by provision of blade pitch control that increases the rotor advance ratio as trajectory velocity or air density increase. Rotor advance ratio is defined as ratio of the vehicle axial trajectory velocity to the linear tangential tip velocity of the rotor blades. Further, the illustrated mechanization of the principles of this invention provides for rotor thrust and blade pitch to be simultaneously controlled according to a function of rotor cone angle whereby complete automatic safety regulation of the rotor is achieved. There exists a unique rotor cone angle for any specific condition of trajectory air velocity and air density which provides complete rotor protection. The described arrangement of this invention permits the rotor blades to detect trajectory velocity and air density through rotor thrust magnitude and to control the blade pitch so as the cause of rotor operation at the required rotor cone angle.

Maximum rotor rotational velocity is a predetermined quantity based upon rotor and blade material strength and temperature of the flight of operation. The interlock control means design and the setting of the rotor speed control are predictable and predeterminable values based upon the maximum expected trajectory conditions. The limits of rotor thrust are similarly governed by material strength of operation and maximum trajectory conditions. The design of the mechanism of the invention therefore in accordance with the maximum flight conditions will provide a non-destructive rotor operation as required.

Illustrated in FIG. 4 are further details of the mechanization of the invention described in connection with FIG. 2. It is noted that parts of FIG. 4 corresponding to parts shown in FIG. 2 are designated by similar reference numerals with the prefix 1 added thereto so that, for example, shaft 16 of FIG. 2 corresponds to shaft 116 of FIG. 4 and blade 30 of FIG. 2 corresponds to blade 130 of FIG. 4 etc.

As will be understood from the description of FIG. 2 a slidable sleeve 118 of the hub assembly carries a spring 123 held in place by a flange 124 and adjusted by a nut 125 with a lower stop element 121 limiting downward motion of the sleeve assembly on the shaft 116. Rotatably mounted on the sleeve by means of bearings 120 is rotor hub having bifurcations 119a and 119b connected by web 119c and having a groove 128 for reception of a pulley belt (not shown in this figure) to counter frictional torque as previously described. Blade sleeve 131 is pivotally mounted in both arms 119a and 119b of the hub. Arm 119a carries the pivotally mounted reference gear 135 with its lever arm 134 fixed thereto. Rotatably mounted for pitch angle motion within the sleeve 131 is blade 130 carrying follower gear 136 which forms part of the interlock control mechanism operable as previously described. Link 143 pivotally interconnects lever arm 134 with summing link or bell crank 140 which is pivotally mounted intermediate the ends thereof to both furcations of the hub. The other end of the bell crank is pivotally mounted to pitch actuator link 146 having one end thereof pivoted intermediate the ends of summing link 148 to which are pivotally connected the collective pitch link 151 and the cyclic pitch link 152.

Collective pitch link 151 is fixed to collective pitch ring 153 rotatably mounted on slidably mounted collective pitch sleeve 154 which is actuated axially of shaft 116 by extensible link actuators 155a and 155b connected between the sleeve 154 and the support 190 which is fixedly connected to the shaft 116 and to the load.

As described in connection with FIG. 2 there is provided a two-axis gimbal assembly comprising an inner gimbal 161 and an outer gimbal 163 having rotatably mounted thereon cyclic pitch ring 160 to which is pivotally connected cyclic pitch link 152. A pair of extensible link actuators 164a and 164b are connected between the support or load 190 and points on the outer gimbal 163 which are spaced apart by ninety degrees so that selective operation of one or both of links 164a and 164b will afford any desired direction of tilt of the cyclic pitch ring 160 with respect to the axis of the shaft 116.

From the described connections for operation of a single blade it will be readily appreciated as can be seen in the drawing of FIG. 4 that there are four identical blades provided and that each such blade is provided with an operating mechanism identical to that described in connection with the blade 130. The rotor hub assembly includes four bifurcated arms to mount the four blades. The furcation 119a of each rotor arm mounts the interlock control means as previously described and each is connected to its corresponding cyclic pitch and collective pitch control mechanism as previously described. Obviously, as illustrated in the drawing there is but a single collective pitch ring 153 and a single cyclic pitch ring 160 to which are connected the four collective pitch links 151 and the four cyclic pitch links 152.

The described embodiment is illustrated as arranged to be launched and deployed from a missile, thus requiring an initial compact folded arrangement of the blades in a position wherein each is substantially parallel to the axis of the shaft. Accordingly, there is preferably provided an arrangement for insuring synchronous deployment of the blades to decrease the substantially ninety degree initial cone angle upon deployment. To this end the second furcation 119b of each rotor hub arm carries a lever arm 171 pivotally connected thereto on an axis aligned with the axis of reference gear 135. Arm 171 is fixed to the blade sleeve 131. An end of lever arm 171 is pivotally connected at 173 to a synchronizer link 170 which is arranged to have a resiliently restrained limited axial extension.

As illustrated in FIG. 7 the link 170 comprises cylinder portion 180 and a piston shaft 181 having a piston 182 affixed thereto intermediate its ends. To avoid effects of compression of entrapped gas, the cylinder chamber is vented at 186. Interposed between the opposite sides of the piston 182 and the respective inner end portions of the chamber of cylinder 180 are a pair of resilient substantially cylindrical rubber washers 183 and 184 each having a circumferentially extending annular concavity 185. These concavities allow for initial elastic compression of the washers to a point where the cavities are filled by compressional distortion of the rubber and the washers behave as solid elastic media. Thus, it will be seen that the synchronizing link is provided with a resilient restrained limited extensibility.

For the purpose of initial deployment of the blades from folded position the synchronizing ring 174 is provided with a stop (not shown) cooperating with the rotor sleeve so as to limit rotation of the ring 174 relative to the rotor beyond a position wherein all of the blades are almost in folded condition each extending at a slight angle to the rotor axis. In this folded condition with further rotation of the synchronizing ring 174 prevented, the synchronizing links are each extended in tension with the washers 183 compressed to afford the final amount of blade folding. Accordingly, the compressed washers 183 exert a force on the links 170, tending to decrease the length thereof and accordingly will provide for initial deployment motion of the blades.

Figure 6:
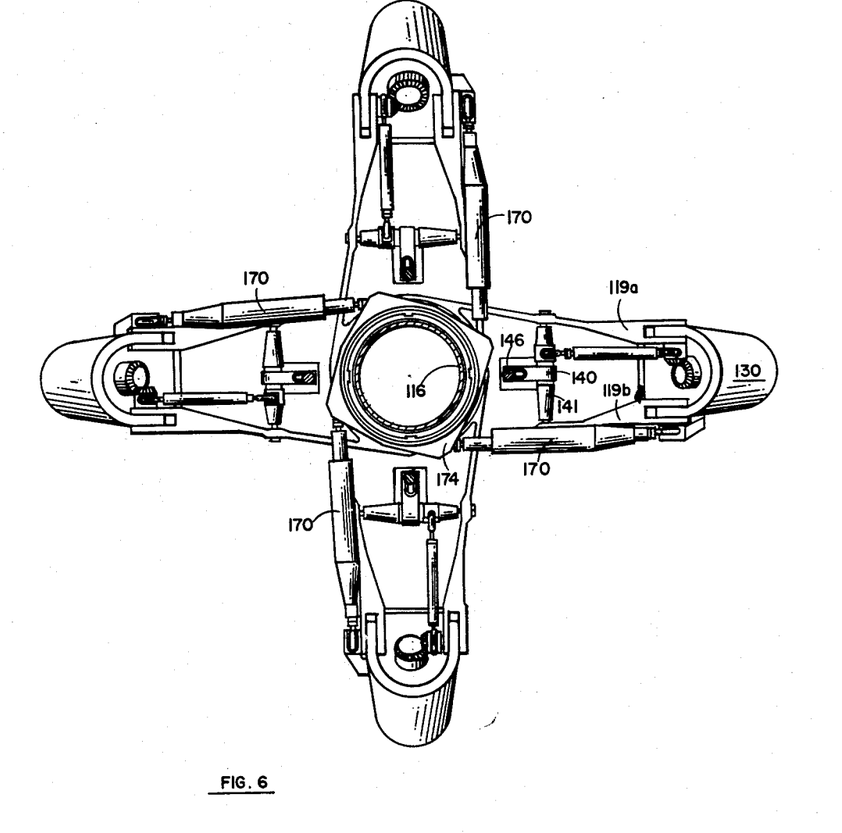

Synchronizing link 170 is pivotally connected at the innermost end thereof to and within a synchronizing ring 174 which is mounted for rotation about the axis of shaft 116 relative to hub 119, in a groove 175 formed in a depending portion of the hub 119. With this arrangement it will be seen that upon flap angle change of one blade the lever arm 171 rotates about its pivotal mounting in arm 119b to shift the synchronizing link 170 in the direction of its own axis so as to impart a force to the synchronizing ring 174 having a component extending tangentially thereof (see FIG. 6). The synchronizing ring is caused to rotate to some extent about the axis of shaft 116. Rotation of the synchronizing ring will cause axial motion of the three other synchronizing links 170 which are attached thereto about the periphery thereof to effect concomitant flap angle change of each of the other three blades in accordance with the flap angle change of the first blade. Thus, the flap angle of each blade is maintained substantially equal to the flap angle of every other blade within the limits of change of length of synchronizing links 170. Four synchronizing links are provided, each connected to its corresponding blade and all connected to the synchronizing ring.

Synchronizing links 170 are provided with a limited restrained axial extension for the purpose of permitting cyclic pitch control. It will be readily appreciated from the above description that the cyclic pitch control will require a pitch angle change and, because of action of the interlock control means, a concomitant flap angle change of individual ones of the blades with respect to other blades. Since the pitch angle and flap angle of the blades must be changed individually during cyclic pitch control of the rotor it may not be desired to provide for a rigid synchronization of flap angle of all blades. Accordingly, the synchronizing links 170 are provided with limited axial motion of an amount sufficient to account for desired maximum individual flap angle changes required for during cyclic pitch control.

It will be seen that there has been described a new and unique control mechanism for a rotary wing assembly wherein pitch angle motion, cone angle motion, and aerodynamic thrust on the blades are interconnected so as to sense and respond to varying conditions of the flight environment and provide adjustments necessary for efficient operation through such environment. The automatic control in response to flight conditions such as flight velocity and atmospheric density is achieved by a relatively simple mechanical arrangement in the described embodiment which is operable in response to detected thrust to send a signal to the pitch angle-cone angle interlock mechanism to effect operations dictated by the sensed environment. The arrangement is such that it may be used alone or in conjunction with cyclic and collective pitch control arrangements. Cyclic and collective pitch control signals are combined in a novel manner and superposed upon a thrust control signal to achieve the desired control whereby the thrust limiting arrangement which affords protection against self-destruction will not interfere with the normal operation and control of the craft.

While rearward folding of the blades has been described, as illustrated for example in FIG. 1, it will be readily appreciated that the disclosed structure is arranged to allow forward folding of the blades without any structural modification. Thus, the flap angle freedom of the blades is substantially 180°. Accordingly, the illustrated mechanization of the invention is further applicable to a number of different tasks and missions wherein forward folded blades may be more suitable.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. For use in a rotary wing craft having blades mounted on a hub for motion through variable pitch and cone angles
   means for controlling pitch angle motion and flap angle motion of each individual blade to control thrust thereon, said controlling means comprising interconnected means on the hub and blades, and operating means mounted on the hub for activating the interconnected means, and
   thrust responsive means independent of coning of the blades for controlling the operating means to limit thrust on the blades.

2. For use in a rotary wing craft having blades mounted for motion through variable pitch and flap angles
   means for interlocking the pitch angle motion and flap angle motion of each individual blade,
   thrust responsive means for providing a thrust control signal substantially independent of operation of said interlocking means,
   pitch control means for providing a pitch control signal,
   summing means for combining said thrust control signal with said pitch control signal, and
   actuating means interposed between said interlocking means and said summing means.

3. The structure of claim 2 including means for interlocking the flap angle motion of the blades and providing each blade with a limited amount of resiliently restrained flap angle motion independent of the flap angle motion of each other blade.

4. In a rotary wing craft having blades mounted for motion through variable pitch and flap angles
   means for interlocking the pitch angle motion and flap angle motion of each individual blade, means responsive to thrust on said blades for actuating said interlocking means, and means for synchronizing the flap angle motion of the blades within predetermined limits of independent flap angle motion of each blade.

5. In a rotary wing craft having a plurality of rotatable blades subject to thrust induced as a result of flight conditions and mounted for motion through variable pitch and flap angles, blade control means for effecting motion of the blades to control rotational velocity of and thrust on the blades, said blade control means comprising means for interlocking pitch angle and flap angle motion of the blades, means responsive to thrust on the blades for actuating said blade control means to control blade rotational velocity and thrust in accordance with flight conditions, said thrust responsive means including means mounting the blades for restrained axial motion in direction of the thrust and connected with said interlocking means.

6. A rotary wing craft comprising a shaft, a hub assembly mounted on the shaft for rotary and limited axial motion, a plurality of blades mounted to the hub assembly with variable pitch and cone angle, interlock control means for providing a predetermined relation between change of pitch angle and change of cone angle of said blades, means for actuating the interlock control means upon motion of the hub assembly, and thrust control means for restraining axial motion of the hub assembly to provide restraint of said interlock control means, whereby the interlock control means is actuated by motion of the hub assembly against restraint of the thrust control means.

7. A rotary wing craft comprising a shaft, a hub assembly mounted on the shaft for rotary and limited axial motion, a plurality of blades mounted to the hub assembly with variable pitch and cone angle, interlock control means interconnected with said hub assembly and said blades for providing a predetermined relation between pitch angle and cone angle of said blades and having a first actuating connection constrained to move with the hub assembly, pitch control means connected between the shaft and said interlock means, and thrust control means for restraining axial motion of the hub assembly to provide restraint of said interlock control means, said thrust control means including means for exerting a restraining force on said hub assembly having relatively large magnitude of change for a first portion of motion of the hub assembly and a relatively small magnitude of change for a second portion of such motion, whereby after an initial axial displacement of the hub assembly the restraining force exerted thereon is substantially constant.

8. Apparatus for the automatic control of a craft having velocity relative a fluid medium comprising:

a hub mounted for rotation and limited axial motion, means for restraining axial motion of the hub, said means exerting upon the hub a force which has a relatively large variation over an initial portion of axial motion of the hub and a relatively small variation over a terminal portion of said axial motion, a plurality of blades mounted to the hub for motion through varying pitch and flap angles, and means responsive to axial motion of the hub for varying pitch and flap angle of the blades to control thrust and blade rotational velocity in response to changes of craft velocity and density of the fluid medium.

9. The apparatus of claim 8 wherein said last mentioned means comprises interlock control means for providing a predetermined ratio of blade pitch angle variation to blade flap angle variation and means connecting the hub to the interlock control means, and a pitch control mechanism connected with the interlock control means.

10. The apparatus of claim 8 wherein the blades are mounted to the hub with substantially 180° of flap angle freedom to allow either forward or rearward folding of the blades.

11. A rotary winged craft comprising:

a shaft, a rotor sleeve slidably mounted on the shaft for limited axial motion, a spring mounted between sleeve and the shaft to urge the sleeve in a first direction axially of the shaft, a rotor hub rotatably mounted upon the sleeve and having a plurality of rotor arms, a blade sleeve pivoted to each rotor arm about a flap pivot axis, a blade rotatably mounted in each blade sleeve for pivotal motion about a longitudinal axis of the blade, a reference gear pivotally mounted about each flap pivot axis, a follower gear fixed to each blade shaft and meshing with an associated reference gear, and means for controlling the reference gear in response to axial motion of the rotor sleeve.

12. The structure of claim 11 including a plurality of flap angle synchronizing levers each pivoted to a rotor arm and connected to a blade sleeve for pivotal motion about the flap pivot axis, a flap angle synchronizing ring rotatably mounted on the rotor sleeve, and a plurality of links having limited resiliently restrained extensibility, each pivotally connected at its respective ends between a flap angle synchronizing lever and the flap synchronizing ring.

13. A rotary winged craft comprising:

a shaft, a rotor sleeve slidably mounted on the shaft for limited axial motion, a spring mounted between sleeve and the shaft to urge the sleeve in a first direction axially of the shaft, a rotor hub rotatably mounted upon the sleeve and having a plurality of rotor arms, a blade sleeve pivoted to each rotor arm about a flap pivot axis, a blade, including a blade shaft, rotatably mounted in each blade sleeve for pivotal motion about a longitudinal axis thereof, a reference gear piovtally mounted about each flap pivot axis, a follower gear fixed to each blade shaft and meshing with an associated reference gear, a lever arm fixed to each reference gear, a bell crank pivoted to each rotor arm, a link pivotally interconnecting each bell crank with its corresponding lever arm, and pitch control means connected with the bell crank.

14. A rotary winged craft comprising:

a shaft, a rotor sleeve slidably mounted on the shaft for limited axial motion, a spring mounted between the sleeve and the shaft to urge the rotor sleeve in a first direction axially of the shaft, means on the shaft for adjusting the force exerted by the spring, a rotor hub rotatably mounted upon the sleeve and having a plurality of rotor arms, a blade sleeve pivoted to each rotor arm about a flap pivot axis,
a blade rotatably mounted in each blade sleeve for pivotal motion about a longitudinal blade axis,
a reference gear pivotally mounted about each flap pivot axis,
a follower gear fixed to each blade and meshing with an associated reference gear,
a lever arm fixed to each reference gear,
a bell crank pivoted to each rotor arm,
a link pivotally interconnecting each bell crank with its corresponding lever arm,
a pitch actuating link pivoted at one end thereof to each bell crank,
a summing link pivoted intermediate its end to the other end of each pitch actuating link,
a collective pitch sleeve slidably mounted on the shaft,
a colletcive pitch ring rotatably mounted on the collective pitch sleeve,
a collective pitch link pivotally interconnecting the collective pitch ring to one end of the summing link,
an actuating mechanism connected to the collective pitch sleeve,
a two-axis gimbal mounted on the shaft,
a cyclic pitch ring rotatably mounted on the gimbal,
a cyclic pitch link pivotally interconnecting the cyclic pitch ring to the other end of the summing link,
an actuating mechanism connected to said gimbal,
a flap angle synchronizing lever pivoted to each rotor arm about the flap pivot axis and fixedly connected to each blade sleeve,
a flap angle synchronizing ring rotatably mounted on the rotor sleeve,
a link having limited, resiliently restrained extensibility pivotally connected at the respective ends thereof to each flap angle synchronizing lever and the flap angle synchronizing ring,
a motor mounted on the rotor sleeve, and
a driving connection between the motor and the rotor hub.

15. A rotary wing craft comprising:
a shaft,
a rotor hub mounted upon the shaft,
a plurality of blades, each mounted on the hub for pivotal motions about its longitudinal axis and about a flap pivot axis,
a reference gear pivotally mounted about each flap pivot axis,
a follower gear fixed to each blade and meshing with an associated reference gear, and
thrust responsive means for pivoting the reference gears about their flap axes.

References Cited by the Examiner
UNITED STATES PATENTS

| | | | |
|---|---|---|---|
| 2,519,762 | 8/50 | Hoffman et al. | 170—160.25 |
| 2,595,642 | 5/52 | Daland | 170—160.25 |
| 2,611,344 | 9/52 | Vanderlip et al. | 170—160.25 |
| 2,627,929 | 2/53 | Sikorsky | 170—160.25 |
| 2,643,724 | 6/53 | Sikorsky | 170—160.13 X |
| 2,721,615 | 10/55 | Pullin et al. | 170—160.13 |
| 2,990,149 | 6/61 | Samms | 244—138 |
| 3,016,217 | 1/62 | Polleys et al. | 244—138 |
| 3,017,147 | 1/62 | Robinson et al. | 244—138 |

FOREIGN PATENTS

| | | |
|---|---|---|
| 272,871 | 7/28 | Great Britain. |

JULIUS E. WEST, *Primary Examiner.*